INVENTOR.
HERBERT T. DRAUDT

ATTORNEYS

INVENTOR.
HERBERT T. DRAUDT
BY Bosworth, Sessions,
Herrstrom + Knowles
ATTORNEYS.

3,262,718
SWIVEL COUPLING FOR COUPLING FLEXIBLE AND RIGID TUBULAR MEMBERS IN END TO END RELATIONSHIP
Herbert T. Draudt, North Olmsted, Ohio, assignor of one-half to Donald A. Draudt, North Olmsted, Ohio
Application Oct. 21, 1964, Ser. No. 407,271, which is a continuation of application Ser. No. 48,091, Aug. 8, 1960. Divided and this application Apr. 14, 1965, Ser. No. 448,047
12 Claims. (Cl. 285—7)

This is a division of applicant's co-pending application, Serial No. 407,271, filed October 21, 1964, now abandoned, which was a continuation of applicant's then co-pending application, Serial No. 48,091, filed August 8, 1960, now abandoned, which was, in turn, a continuation-in-part of applicant's then co-pending application, Serial No. 655,381, filed April 26, 1957, now United States Patent No. 3,167,330.

This invention relates to coupling means and more particularly to coupling means for flexibly and swively joining a rigid tubular member to and with a flexible tubular member of hose. This invention is adapted for use in the vacuum cleaner art and more particularly is adapted to effect a coupling between the wand, upon which the various attachments are selectively mounted, and the hose, which functions as a flexible conduit between the sweeper and the wand.

It is customary in the art to fabricate the wand from metal or a substantially non-flexible material and to effect the coupling between the wand and the flexible hose by sliding or forcing the hose over one end of the wand, the parts being of such relative size that the coupling thus effected is substantially air-tight and resists by friction, at least to some degree, or by catch means, accidental disengagement. Further it has been the usual practice to equip the wand, adjacent the end which engages the hose, with a swivel to facilitate the use of the wand and attachments by increasing the ease with which the user may turn, twist and maneuver the wand, and therefore the attachment, when and as needed in order to effectively use the attachments.

Such swivels have been commonly made by first enlarging the end portion of the metal tube, which forms the body of the wand, to form an internal shoulder a short distance from the end of the tube, then inserting a metal tubular nipple having a flanged end within the enlarged portion of the tube so that the flange abuts against the shoulder and finally bending or forcing the enlarged end of the tube loosely over the flange. This structure prevented the nipple from pulling out of the tube not permitted the tube and nipple, and therefore the tube and hose, which was pushed over and engaged upon the free end of the nipple, to rotate or swivel relative to each other.

Difficulty has been experienced with such apparatus, especially when the hose is formed, as it commonly is, from an extruded plastic tube within which a coiled spring or wire helix is released to engage the interior wall of the tube to shape and strengthen the same. In such instances there has been a marked tendency for the hose to rupture, prematurely, adjacent the inserted end of the nipple because of the wear and strain induced on the hose by the action of the end of the rigid nipple as the hose and nipple are bent relative to each other during use.

Further the conventional swivel has proven ineffective because the use of steel to steel or other bearing surfaces having high coefficients of friction necessitated making the swivel joint so loose, in order that it would swivel at all, that air leak became excessive and the nipple would cock and rack within the swivel joint, relative to the wand, so as to engage the wand laterally and bind against the side of the joint, thereby resisting and impeding relative rotational movement between the wand and nipple. Additionally such apparatus has proven disadvantageous because of the relatively high costs of production.

It is therefore a general object of this invention to provide an improved more efficient coupling for detachably coupling flexible and rigid tubular members together. Another object of this invention is the provision of a coupling for detachably coupling flexible and rigid tubular members which is produced and used with greater economy and ease than prior couplings for similar purposes and which protects the flexible tubular member from damage and wear due to bending relative to the rigid member to which it is coupled.

Further objects of this invention include the provision of a coupling for detachably coupling a flexible hose, and a rigid tube or member, which is flexible adjacent the flexible hose; which forms a coupling which resists leakage of air; which, though secure against accidental disengagement, may be readily disengaged at the option of the user; and, which is more efficient, effective, and economical for coupling a flexible tubular member which another tubular member.

Another object of this invention is to provide a coupling, for detachably securing a vacuum cleaner hose to and with a wand or other member, attachment or the like, which is pleasing in appearance, effective in use, and positively but releasably locks the coupling in place so as to prevent accidental disengagement.

Still another object of this invention is the provision of a coupling, for detachably securing a vacuum cleaner hose to and with a wand or other member, attachment or the like, which prevents and/or mitigates against the fracturing, wearing and/or tearing of the hose in or near the zone at which coupling is effected.

A still further object of this invention is the provision of a coupling having the above described characteristics which includes means providing for rotational movement and swivelling of the one member being coupled relative to and independently of the other.

Other objects of this invention include the provision of a coupling, for coupling tubular members such as vacuum cleaner tubes and wands, having an improved, more efficient and easier operating swivel means providing for rotational movement of one member being coupled relative to and independently of the other; which obviates cocking or angular lateral engagement between the members being coupled or parts of the coupling; which prevents binding and similar induced resistances to the relative rotational movement of the coupled members coupled; which resists leakage of air; which is easily and economically manufactured and/or used; and, which obtains one or more of the objects and advantages herein set forth.

The manner of obtaining these and other objects and advantages of this invention will become apparent from the following description of preferred and modified forms thereof, reference being had to the drawings in which.

Broadly, a coupling embodying this invention is adapted to couple a hose or flexible tubular member to a rigid tubular member in end-to-end relationship. The coupling includes a bearing member which is rotatably mounted on one end of the rigid member and a bendable or flexible coupling member or sleeve which extends between, engages and is axially co-extensive with a portion of both the bearing member and the flexible member. In its preferred form the coupling also includes a locking member for detachably holding and locking the coupling in assembled relationship with the rigid member, albeit in other forms of this invention the coupling member is detachably engaged with the bearing member by other means and it is not without the scope of all of the precepts and objects of this invention to fixedly secure the coupling member to the bearing and flexible members or one of them.

More particularly, a preferred coupling embodying this invention is adapted to detachably couple a vacuum cleaner attachment hose to the longitudinally rigid instrument or member, commonly called a wand, upon which the various attachments are detachably mounted. A coupling embodying this invention is particularly useful in coupling a hose formed from a thin tube or cylinder of plastic, such as vinyl, having disposed therein a coiled or helical wire of slightly larger diameter than the mean diameter of the tube. The helical wire strengthens and supports the extruded tube so that the tube does not collapse or close during use, while permitting great longitudinal flexibility. Such hose has corrugated or threadlike internal and external surfaces.

Figure 1:
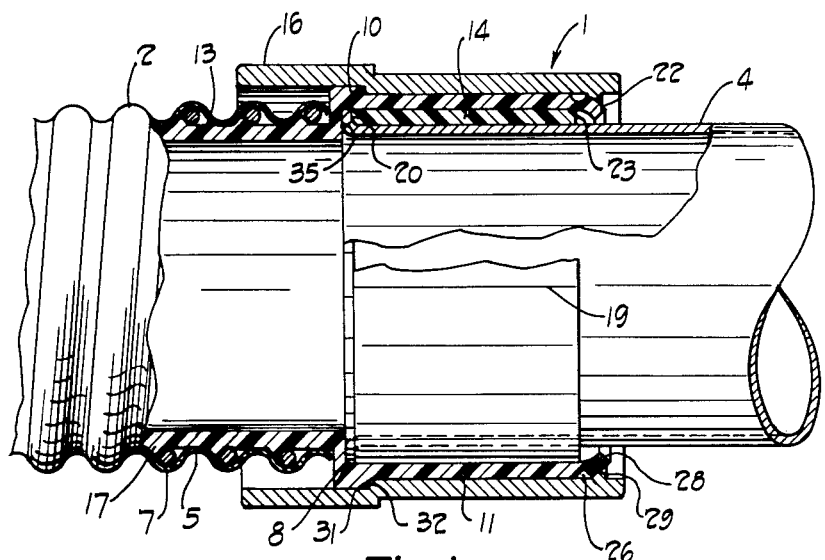
FIGURE 1 is a longitudinal view, partly in section and partly in elevation, of a coupling embodying a preferred form of this invention and a portion of both the wand and hose coupled thereby.
Figure 3:
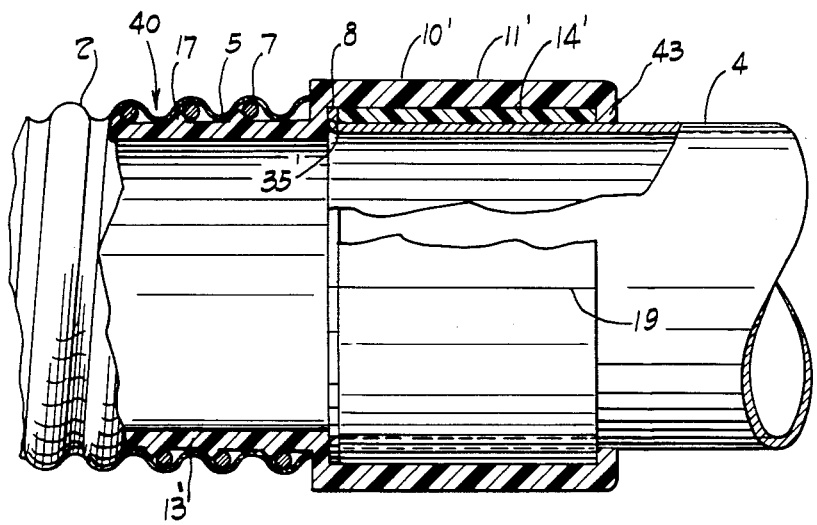
FIGURE 3 is a view, similar to FIGURE 1 showing a coupling embodying a modified form of this invention.
Figure 4:
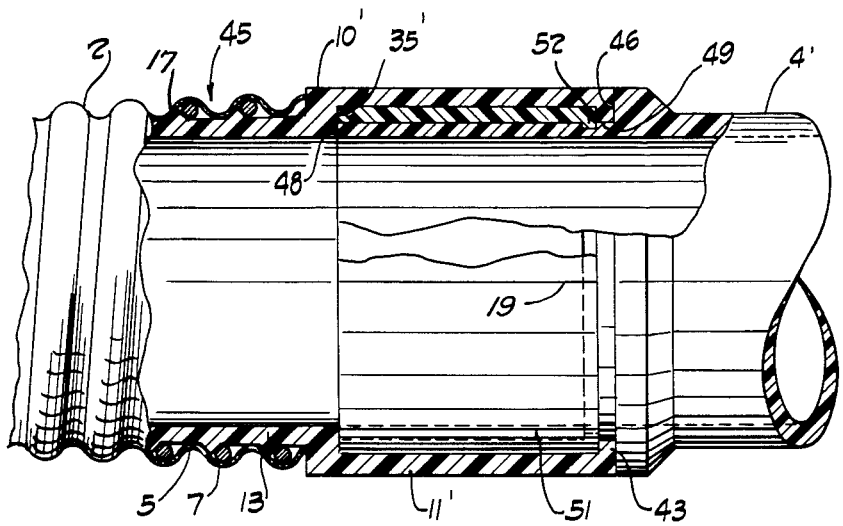
FIGURE 4 is a view similar to FIGURE 1 showing a coupling embodying another modified form of this invention.

Further a coupling embodying this invention is useful for coupling hose of the character described above either with a conventional metal wand having a flared end, see FIGURES 1 and 3, for example, or with a wand made of plastic or other material, see FIGURE 4.

A coupling embodying a preferred form of this invention is indicated generally at 1 in FIGURE 1, and is shown together with the hose 2 and wand 4 which are coupled thereby.

Hose 2 is of the conventional type described above and comprises a thin walled, extruded plastic tube 5 having disposed therein a reinforcing wire 7. Wire 7 is a helix having a greater mean diameter than the mean diameter of tube 5. Thus hose 2 has a corrugated structure providing thread-like inner and outer surface and sufficient lateral rigidity to prevent the tube 5 from collapsing, but retaining great longitudinal flexibility so that the hose may be bent sharply and easily at the convenience, necessity and will of the user.

Wand 4 comprises a rigid, hollow tube having a flange 8 on the end to which the hose 2 is to be coupled and having means, not shown, at the other end for interchangeably mounting the cleaning attachments thereon.

When hose 2 is coupled directly to a rigid member such as wand 4, it is easily abraded, torn or fractured adjacent the end of the wand because of the relative binding and twisting which occurs and is concentrated, during use, at and about the end of the wand. Coupling 1 is adapted to couple hose 2 and wand 4 in end-to-end relationship so that they have easy, efficient rotational movement relative to each other, on the one hand, and can bend longitudinally relative to each other, on the other hand, all without deleterious effect on the hose and substantially without leakage of air between the coupling and the members coupled thereby, respectively, or between the parts of the coupling itself. Additionally, coupling 1 couples hose 2 and wand 4 together tightly and firmly but is easily released in order to permit detachment or uncoupling of the hose and wand.

Briefly, coupling 1 comprises a cylindrical sleeve 10 having one end 11, which extends concentrically with and longitudinally along wand 4, and a second end 13, which engages and extends concentrically with and longitudinally along hose 2. Coupling 1 also comprises a bearing member 14 disposed between wand 4 and end 11 of sleeve 10 whereby wand 4 and end 11 of sleeve 10 are rotatable about their common longitudinal axis, relative to and independently of each other. Coupling 1 also includes a locking member 16 which functions to releasably secure the coupling and coupled members together as well as to protect the coupling and to improve the appearance thereof.

More particularly sleeve 10 is preferably a unitary member molded of vinyl plastic having a durometer hardness on a Shore A scale of about 85.

End 13 of sleeve 10 is adapted to control the sharpness of the bending imposed on hose 2, by providing a soft, pliable edge about which the hose is bent, to concentrate the burden of relative bending between the hose and wand in the coupling 1 and more particularly within sleeve 10 and to provide good, substantially air tight engagement between the sleeve and hose. Preferably end 13 engages hose 2 so as to be easily attached and detached by the user while effectively resisting accidental disengagement during use, because of tension induced in the hose from pulling on the same, albeit end 13 may be glued or otherwise fixedly secured to hose 2, if desired.

End 13 of sleeve 10 is therefore provided with walls which have a thickness intermediate the thickness of tube 5 and sleeve end 11 and with threads 17 which are complementary to and adapted to engage and coact with the corrugations and/or threads of hose 2. Further, when, as is preferred, wire 7 is a helix, threads 17 are preferably on the exterior of sleeve end 13 and sleeve end 13 has a diameter such as to fit within hose 2. Thus, when hose 2 is threaded on sleeve end 13 and tends to be compressed the diameter of helix 7 tends to increase thereby facilitating the assembly of the hose on the sleeve. On the other hand, when a pull or tension is exerted on the hose 2 during use, the wire helix 7 is or tends to be extended and contracted causing hose 2 to grip and engage sleeve end 13 more firmly. Nevertheless when desired the user can easily detach hose 2 from sleeve end 13 by unscrewing the same, preferably while exerting a slight compressive force on the end of the hose.

Sleeve end 11 is adapted to detachably engage bearing member 14 and to cooperate with the wand 4, bearing member 14 and locking member 16 to provide a substantially airtight, rotational joint between the sleeve 10 and the wand.

In order to facilitate assembly of the coupling, bearing member 14 is preferably split longitudinally at 19. Bearing member 14 is preferably made of butadiene styrene co-polymer, nylon or similar material having a low coefficient of friction to facilitate relative rotation between it and the wand and sleeve, respectively. Bearing member 14 is preferably rounded or chamfered, adjacent flange 8, as at 20, in order to be complementary to and fit closely against flange 8.

Sleeve end 11 has an interior diameter such as to engage snugly though freely over the exterior diameter of bearing member 14. Sleeve end 11 is of greater axial length than the bearing member so as to have a free end 22 which extends axially beyond the end 23 of bearing member 14 remote from flange 8. End 22 of sleeve 10 is adapted to be selectively constricted diametrically to have a lesser diameter than the external diameter of bearing member 14 so as to engage over bearing member end 23 and hold sleeve 10 in position on bearing member 14.

Sleeve end 22 is constricted diametrically and coupling 1 is locked in the assembled position against accidental release by means of locking member 16 and the coaction between locking member 16 and sleeve end 11 including particularly end 22 thereof.

To this end the external surface 25 of sleeve end 11 is grooved or undercut, as at 26, to form an external bead lip or ridge 28 at end 22 and to form a hinge-like portion whereby bead 28 is joined with the main body of sleeve end 11 but is able to flex and constrict independently of the rest of sleeve end 11 in response to radial pressures exerted on bead 28 and to have smaller internal diameter than the internal diameter of the rest of sleeve portion 11. Further bead 28 is of such size and groove 26 of such flexibility that bead 28 can be constricted so as to have a smaller internal diameter than the external diameter of bearing member 14.

Locking member 16 comprises a cylinder or sleeve of steel, or other suitable material, having a sufficient rigidity and strength to displace bead 28 in the manner described below. Locking member 16 has an internal diameter such as to provide a sliding fit over the external surface of sleeve portion 11.

Figure 2:
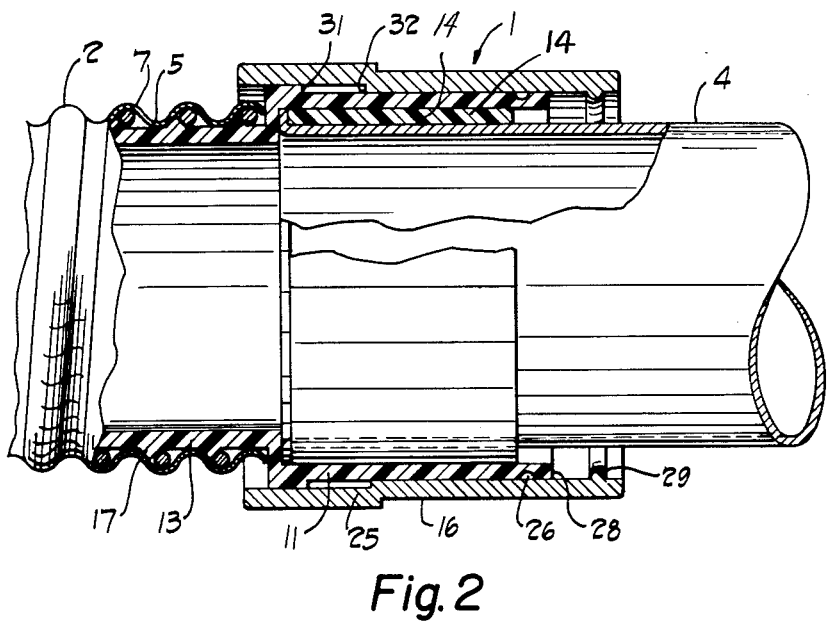
FIGURE 2 is a view similar to FIGURE 1 showing the coupling partly assembled before the locking member is seated.

In order to engage and constrict bead 28 locking member 16 is provided with an internal rib 29, see FIGURE 2, which is disposed so as to be in axial alignment with bead 28 when locking member 16 is properly positioned on sleeve 10. Rib 29 is of sufficient thickness to tightly engage and constrict and bend bead 28 to a lesser diameter than the external diameter of bearing member 14 when rib 29 is engaged over bead 28.

In order to ensure that locking member 16 and more particularly rib 29 seats and remains in proper axial alignment with sleeve 10 and bead 28 and to ensure that rib 29 is not pushed over sleeve 10 sufficiently so as to be aligned with groove 26 instead of bead 28, the end of sleeve portion 11 adjacent sleeve portion 13 is provided with an external lip on flange 31 facing away from sleeve end 11 and locking member 16 is provided with a complementary internal shoulder 32 facing away from rib 29, see FIGURE 2. When shoulder 32 is pushed into engagement with flange 31, rib 29 is axially aligned with and engages and radially constricts bead 28 in the manner described above to lock the coupling in the assembled position shown in FIGURE 1.

FIGURE 2 shows the relative position of the groove or hinge 26, bead 28, rib 29, flange 31 and shoulder 32 when the same are unstressed and just before locking member 16 is fully and completely seated to assemble the coupling.

A coupling embodying preferred form of this invention is used by inserting sleeve portion 13 into a hose 2, placing bearing member 14 about wand 4 adjacent flange 8 and pushing the wand and bearing member into portion 11 until flange 8 of wand 4 engages internal shoulder 35 of sleeve 10 while maintaining bearing member 14 adjacent flange 8. Locking member 16 is then slid over the free end of wand 4 and pushed over sleeve portion 11 until shoulder 32 engages against flange 31 with rib 29 engaging and constricting bead 28 into the position shown in FIGURE 1, substantially simultaneously with the seating of shoulder 32 against flange 31.

The constricting of bead 28 is normally met with a sudden increase in the resistance to pushing the locking member over the sleeve and a popping noise as the bead is constricted and the hinge on groove 26 deformed.

A coupling embodying a modified form of this invention is shown in FIGURE 3, wherein like reference characters refer to like parts as in FIGURES 1 and 2. The modified form of coupling is indicated generally at 40 and is shown together with the wand 4 having flange 8, and hose 2, comprising tube 5 and reinforcing wire 7, which are coupled thereby.

The coupling 40 comprises a longitudinally extending, somewhat flexible or elastic coupling member or sleeve 10' which is of greater longitudinal rigidity than hose 2. Sleeve 10' may be made from any desirable material having the necessary resultant physical characteristics but is conveniently of molded vinyl plastic, having a durometer hardness on a Shore A scale of 85 to 90 when of the size proportions shown, and including a resinous plasticizer to inhibit and reduce plasticizer migration. When so formed sleeve 10' has the necessary strength and toughness to resist the abrasive action of the end of the wand 4 when the hose and wand are bent relative to each other, as well as the necessary flexibility and softness to resiliently bend to a limited degree in order to provide a smooth arcuate transition between the wand and the hose while precluding abrading the hose adjacent its own end 13' as in the preferred form of this invention.

The sleeve 10' is of generally cylindrical shape with a hollow, longitudinally extending interior. The respective end portions 11' and 13' of sleeve 10' are adapted to overlap and be coextensive with a portion of the wand and hose, respectively, to the end that the same are coupled in an end-to-end relation and the bending motion of one is not transmitted directly to the other.

Further in order better to obtain the objects of my invention and prevent an abrupt and deleterious bending of the hose, I prefer that the portion 13' of sleeve 10' be increasingly flexible from its end adjacent portion 11' of the sleeve, rightward end as viewed, to its free end, leftward end as viewed. Thus the free end of portion 13' of sleeve 10' is adapted to bend to a greater degree and with greater ease in response to a given force than the rightward end, as viewed, thereof and the degree and ease of bending of any increment of the portion 13' of sleeve 10' is proportional to the relative location of such increment to the respective ends of the portion 13'. The free end of portion 13' is adapted to bend with the hose to avoid abrading the same and the portion 13' of the sleeve, in its entirety, provides a smoothly bending or curving juncture between the hose and wand. Further since portion 13' of sleeve 10', as with the free end of portion 13 of sleeve 10, can be bent any direction in the manner of a universal joint the motion and bending of the hose and portion 13' is not confined to a predetermined transverse plane but rather the hose may extend from the sleeve in any direction throughout the entire 360° of arc of a plane transverse to the axis of the sleeve.

Portion 13' is, also, preferably formed with external threads or corrugations 17 so that sleeve end 13' is disposed within hose 2 in the manner and for the purpose described above with respect to end 13 of sleeve 10, albeit end 13', as with end 13, may be internally threaded to engage over hose 2, if desired.

Coupling 40 also includes means such as longitudinally split bearing or bushing 14', which functions in the same manner and for the same purpose as bearing 14 in the preferred form of this invention and is conveniently similar thereto.

Bearing 14' is rotatable relative to wand 4 and is detachably held in place about the wand and against flange 8 in the assembled coupling 40 by means of end 11' of sleeve 10'. To this end the end 11' of sleeve 10' preferably has an internal diameter substantially equal to but slightly larger than the external diameter of bearing 14' and provided with an internal flange or lip 43 which has an internal diameter greater than the external diameter of wand 4 but less than the external diameter of bearing 14'. Sleeve 10', also, is preferably provided with an internal shoulder 35' intermediate sleeve ends 11' and 13' against which the flange 8 abuts. The longitudinal distance between shoulder 35' and lip 43 is substantially equal to or just slightly greater than the combined length of flange 8 and bearing 14'. Thus when coupling 40 is assembled with sleeve 11' over bearing 14' and lip 43 engaging over the end of bearing 14', coupling 40 is held in position longitudinally, while providing for relative rotation between the sleeve (and thereby the hose) and the wand. Coupling 40 is assembled by placing bearing 14' about wand 4, adjacent flange 8, and holding bearing 14' in place about wand 4, while expanding lip 43 of sleeve 10' over bearing 14' and then pushing lip 43 and end 11' of sleeve 10' along bearing 14' while holding the bearing against displacement away from flange 8, until lip 43 seats over the free, right wand, as viewed, end of bearing 14, as shown in FIGURE 3.

A coupling embodying another modified form of the invention is indicated generally at 45 in FIGURE 4, wherein like reference characters refer to like parts as in FIGURES 1, 2, and 3.

Coupling 45 is an example of coupling embodying this invention and adapted for coupling hose 2 with a plastic wand 4', particularly adapted for use with this invention, instead of the conventional wand 4 depicted in FIGURES 1, 2 and 3.

Coupling 45 embodies a sleeve 10' which is preferably similar to the sleeve of coupling 40, FIGURE 3, and has similar end portions 11' and 13', internal shoulder 35' and lip 43 and coupling 45 is adapted to couple and coact with hose 2 in the same manner as couplings 1 and 40.

As shown in FIGURE 4, the wand 4' is provided with an external circumferential shoulder 46, which is spaced from the end 48 of the wand, by a distance equal to or just slightly greater than the distance between the lip 43 and shoulder 35' of sleeve 10'. Wand 4' also has an external, circumferential groove 49, which is spaced from the face of shoulder 46 and nearer the end 48 of wand 4' by a distance equal to or only slightly larger than the longitudinal thickness of lip 43. Shoulder 46 and portion 11' of sleeve 10' conveniently have the same external diameter.

Coupling 45 is provided with a preferably split bearing 51, which, as with bearings 14 and 14', may be either a unitary or multiple piece structure, and which functions for the same purpose as bearings 14 and 14' in couplings 1 and 40, respectively.

Bearing 51 is shown, by way of example, as a unitary structure having an inwardly facing lip or flange 52 adapted to seat in groove 49, when bearing 51 is disposed over wand 4'. When properly positioned on wand 4', bearing 51 extends from groove 49 toward the end 48 of wand 4', is rotatable about and relative to the wand and, is held in place about and against wand 4' by the interlock between the groove 49 and lip 52 and by its spring or natural tendency to assume its most efficient (cylindrical) shape. The internal diameter of bearing 51 is equal to or only slightly larger than the adjacent external diameter of wand 4'. The external diameter of bearing 51 is greater than the internal diameter of lip 43 on sleeve 10' and preferably less than the diameter of the shoulder 46 by an amount equal to about twice the diametrical thickness of the end portion 11' of the sleeve 10'.

The bearing 51 is positioned by expanding the same sufficiently to permit the lip 52 to slide over the end 48 of wand 4' and then pushing the bearing along the wand until the lip seats in the groove 49. Sleeve 10' of coupling 45 is then seated over bearing 51 in the same manner that it is seated over bearing 14' in assembling coupling 40.

Modifications, changes and improvements to the above described and illustrated preferred and modified forms and embodiments of this invention may occur to those skilled in the art, who come to understand the principles and precepts thereof, without departing from the spirit and substance of the invention. Accordingly it is desired that the scope of the patent obtained hereon not be limited to the forms and embodiments of the invention herein particularly described and set forth but only consistent with the advance by which the invention has promoted the art.

I claim:

1. In combination a flexible tubular member having an end, a rigid tubular member and means for coupling said members in end to end relationship, said flexible tubular member comprising a hollow flexible tube and a wire helix of greater mean diameter than the mean diameter of said tube disposed therein, said flexible tubular member having a corrugated surface, said rigid tubular member comprising a hollow rigid tube having a flanged end, said coupling means comprising a unitary elongated, hollow, flexible sleeve of greater rigidity than said flexible tubular member and a bearing member, said bearing member comprising a hollow, longitudinally split bushing and being disposed about said rigid tubular member in snug rotatable engagement therewith and adjacent said flange and having a relatively low co-efficient of friction with said rigid tubular member, said sleeve having two end portions, one said end portion of said sleeve extending longitudinally and concentrically with a portion of said flexible tubular member adjacent said end thereof and having a surface engaging said corrugated surface of said flexible tubular member, the other said end portion of said sleeve being disposed over and in engagement with said bearing member and extending longitudinally and concentrically with said rigid tubular member and bearing member for a portion of the length of said rigid tubular member and for the total length of said bearing member, said other end portion of said sleeve having an integral, inwardly extending circumferential lip at the end thereof remote from said one end portion of said sleeve, said lip having an internal diameter greater than the external diameter of said rigid tubular member and less than the external diameter of said bearing member, said bearing member engaging and extending between said flange of said rigid tubular member and said lip of said sleeve.

2. In the combination of a rigid tubular member having an end, a flexible tubular member having an end, and a coupling for coupling the tubular members in end to end relationship, the improvement that said coupling comprises a unitary, elongated, hollow sleeve having first and second end portions, said first end portion of said sleeve being in longitudinally extending engagement with said flexible tubular member and having an axis concentric therewith, said first end portion of said sleeve being flexible but less flexible than said flexible tubular member and bending with and modulating the bending of said flexible tubular member about said axis, said second end portion of said sleeve extending longitudinally and concentrically with said rigid tubular member, said coupling also comprising a bearing, said bearing being disposed between and engaging said rigid tubular member and said second end portion of said sleeve and providing for relative rotational movement therebetween, said second end portion of said sleeve having an internal lip overlapping said bearing, said lip having an internal diameter less than the external diameter of said bearing and greater than the external diameter of said rigid tubular member, a portion of said rigid tubular member having a greater diameter than at least a portion of said bearing more remote from said end of said rigid tubular member than said portion of said rigid tubular member.

3. The combination according to claim 2 in which said last named portion of said rigid tubular member comprises a flange on said end of said rigid tubular member, said flange is disposed within said second end portion of said sleeve, and said bearing is disposed between said flange and said lip of said sleeve, respectively.

4. The combination according to claim 2 in which said rigid tubular member has an exterior circumferential groove longitudinally spaced from said end of said rigid tubular member, said bearing member comprises a bushing having a relatively low coefficient of friction with said rigid tubular member and having an internal circumferential lip and being disposed about said rigid tubular member adjacent said end thereof with said lip of said bushing in said groove, said bushing being in snug rotatable engagement with said rigid tubular member, said last named portion of said rigid tubular member being the portion thereof between said end and said groove.

5. In the combination of a rigid tubular member having an end, another tubular member having an end, and a coupling for coupling the tubular members in end to end relationship, the improvement that said coupling comprises a unitary, hollow, longitudinally extending sleeve and a bearing member, said sleeve having one end portion being flexible and extending longitudinally and concentrically with said rigid tubular member and a second end portion engaging said other tubular member, said bearing member comprising a longitudinally split bushing having a relatively low coefficient of friction with said rigid tubular member and being mounted on said rigid tubular member adjacent said end thereof and in any rotatable engagement therewith, and being within and in snug engagement with said one end portion of said sleeve, an inwardly extending lip on said one end portion of said sleeve and overlapping said bearing member, said lip having an internal diameter greater than the external diameter of said rigid tubular member and less than the external diameter of said bearing member, an exterior circumferential groove in said rigid tubular member and longitudinally spaced from said end thereof, and an internal circumferential lip on said bearing member and disposed in said groove and preventing said bearing member from displacing longitudinally off said one end of said rigid tubular member.

6. In combination a flexible tubular member, a rigid tubular member and means for coupling said members in end to end relationship, said means comprising an elongated hollow sleeve, a bearing member and a locking member, said bearing member being mounted on said rigid tubular member adjacent one end thereof, being rotatable on and relative to said rigid tubular member and having an end remote from said one end of said rigid tubular member, said sleeve having end portions and an external shoulder, one end portion of said sleeve being flexible but of greater rigidity than said flexible member and engaging and extending longitudinally and concentrically with a portion of said flexible member, the other end portion of said sleeve engaging said bearing member and extending longitudinally and concentrically with said bearing member and said rigid tubular member for a portion of the length of said rigid tubular member, said other end portion of said sleeve having a bead at the end thereof remote from said one end portion of said sleeve and a groove adjacent said bead and nearer said one end of said sleeve than said bead, said groove forming hinge means in said other end portion of said sleeve between said bead and the remainder of said other end portion, said locking member being disposed about said sleeve and having an internal shoulder engaged against said external shoulder of said sleeve and an internal arcuate rib engaging said bead and constricting said bead to have a lesser internal diameter than the external diameter of said bearing member, said bead being adjacent said end of said bearing member and more remote from said one end portion of said sleeve than said end of said bearing member, and a flange on said one end of said rigid tubular member, said flange being of greater external diameter than the internal diameter of said bearing member.

7. The combination according to claim 6 in which said locking member substantially covers and conceals said sleeve.

8. The combination according to claim 6 in which said one end portion of said sleeve extends within said flexible tubular member.

9. A coupling for coupling a rigid tubular member having an end to another tubular member in end to end relationship, said coupling comprising a hollow, tubular, longitudinally extending sleeve and a bearing member, said bearing member being adapted to be mounted on said rigid tubular member adjacent one end thereof, said sleeve having one end portion engaging over said bearing member and extending longitudinally and concentrically with said rigid tubular member and said bearing member and having a second end portion extending concentrically with said another tubular member, said bearing member providing for rotation of said sleeve relative to said rigid tubular member, said coupling also comprising means retaining said bearing member and sleeve in position on said rigid tubular member, said last named means comprising a bead in said one end portion of said sleeve and spaced from said second end portion of said sleeve, a groove in said one end portion of said sleeve adjacent said bead and forming hinge means in said one end portion of said sleeve intermediate said bead and said second end portion of said sleeve, a hollow cylindrical locking member disposed about said sleeve and having an internal rib engaging said bead and constricting said bead to have a lesser internal diameter than the external diameter of said bearing member, said bead being adjacent but more remote from said second end portion of said sleeve than the end of said bearing most remote from said second portion of said sleeve and means preventing said bearing member from displacing longitudinally off said one end of said rigid tubular member.

10. The combination according to claim 9 in which said locking member substantially covers and conceals said sleeve.

11. In combination a flexible member, a rigid member and means for coupling said members in end to end relationship, said means comprising an elongated hollow sleeve and a bearing member, said bearing member being mounted on said rigid member adjacent one end thereof, one portion of said sleeve being in engagement with and extending longitudinally and concentrically with a portion of said flexible member, another portion of said sleeve engaging said bearing member and extending longitudinally and concentrically with said bearing member and said rigid member for a portion of the length of said rigid member, said sleeve being rotatable relative to said rigid member, said bearing member having an end remote from said one portion of said sleeve, and means retaining said bearing member on said rigid member, said last named means comprising a bead at the end of said sleeve remote from said one portion of said sleeve, a groove in said sleeve adjacent said bead and nearer said one end portion of said sleeve than said bead, said groove forming hinge means between said bead and the remainder of said sleeve, an external shoulder on said sleeve intermediate said portions thereof, and a hollow cylindrical locking member disposed about said sleeve, said locking member having an internal shoulder and an internal arcuate rib, said internal shoulder engaging said external shoulder of said sleeve, said rib engaging said bead and constricting said bead to have a lesser internal diameter than the external diameter of said bearing member, said bead being adjacent said end of said bearing member and more remote from said one portion of said sleeve than said end of said bearing member, a part of said rigid member intermediate said one end thereof and said bead having a greater external diameter than the least internal diameter of said bearing member nearer said bead.

12. In combination a flexible member, a rigid member and means for coupling said members in end to end relationship, said means comprising an elongated hollow sleeve, having end portions and an external shoulder, a bearing member and a locking member, said bearing member being mounted on said rigid member adjacent one end thereof, being rotatable on and relative to said rigid member and having an end remote from said one end of said rigid member, one end portion of said sleeve being flexible but of greater rigidity than said flexible member and engaging and extending longitudinally and concentrically with a portion of said flexible member, the other end portion of said sleeve engaging said bearing member and extending longitudinally and concentrically with said bearing member and said rigid member for a portion of the length of said rigid member, said other end portion of said sleeve having a bead at the end thereof remote from said one end portion of said sleeve and a groove adjacent said bead and nearer said one end portion of said sleeve than said bead, said groove forming hinge means in said other end portion of said sleeve between said bead and the remainder of said other end portion, said locking member being disposed about said sleeve and having an internal shoulder engaged against said external shoulder of said sleeve and an internal arcuate rib engaging said bead and constricting said bead to have a lesser internal diameter than the external diameter of said bearing member, said bead being adjacent said end of said bearing member and more remote from said one end portion of said sleeve than said end of said bearing member, a part of said rigid member intermediate said one end thereof and said bead having a greater external diameter than the least internal diameter of said bearing member nearer said bead.

References Cited by the Examiner

UNITED STATES PATENTS

| | | | |
|---|---|---|---|
| 2,455,544 | 12/1948 | Yonkers | 285—7 |
| 2,570,347 | 10/1951 | Humphrey | 285—239 |
| 2,582,446 | 1/1952 | Martinet | 285—7 |
| 2,705,651 | 4/1955 | Myers | 285—231 |
| 2,827,311 | 3/1958 | Kasper | 285—7 |
| 2,899,216 | 8/1959 | Brock | 285—7 |
| 2,918,314 | 12/1959 | Kemnitz | 285—239 |

FOREIGN PATENTS 595,935  12/1947  Great Britain.

CARL W. TOMLIN, *Primary Examiner.*

T. F. CALLAGHAN, *Assistant Examiner.*